Aug. 4, 1970    E. H. DUKATZ ET AL    3,522,422
CONCEALED HEADLIGHT MECHANISM
Filed Dec. 27, 1967    4 Sheets-Sheet 1
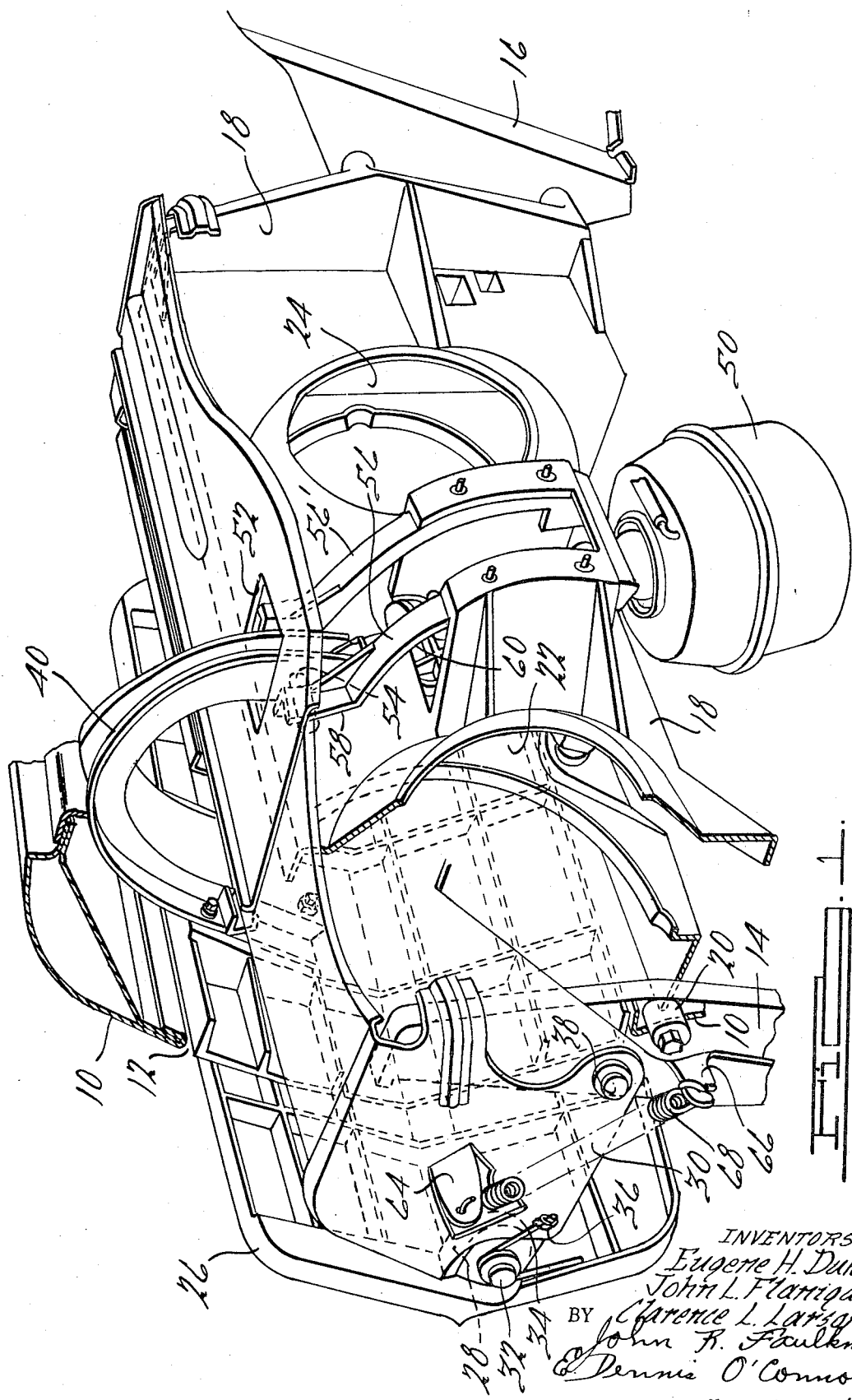
INVENTORS.
Eugene H. Dukatz,
John L. Flanigan,
BY Clarence L. Larson
John R. Faulkner
Dennis O'Connor
ATTORNEYS.

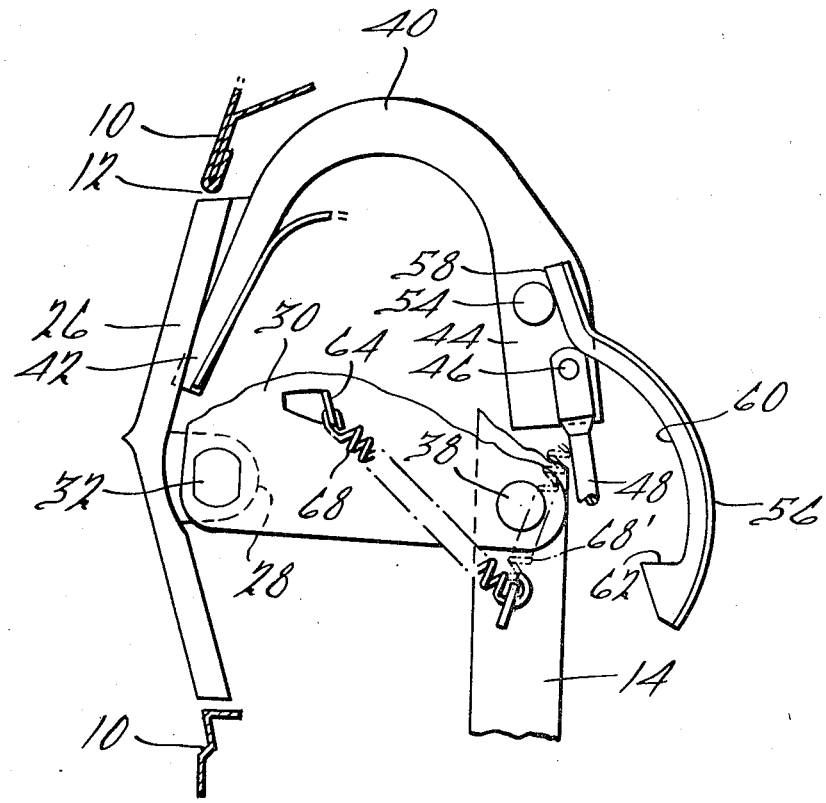

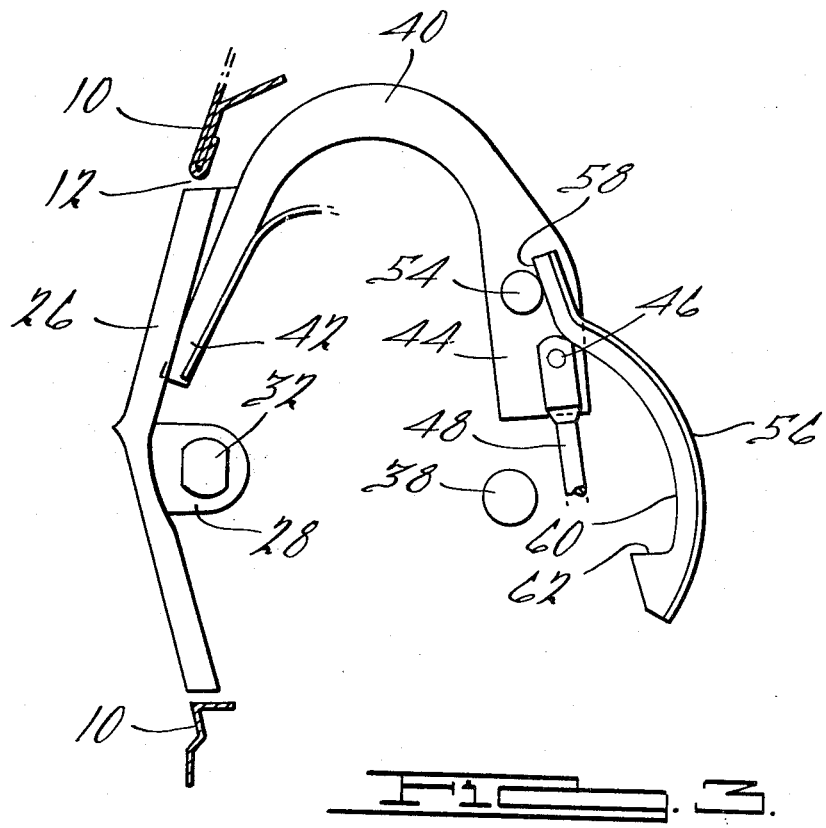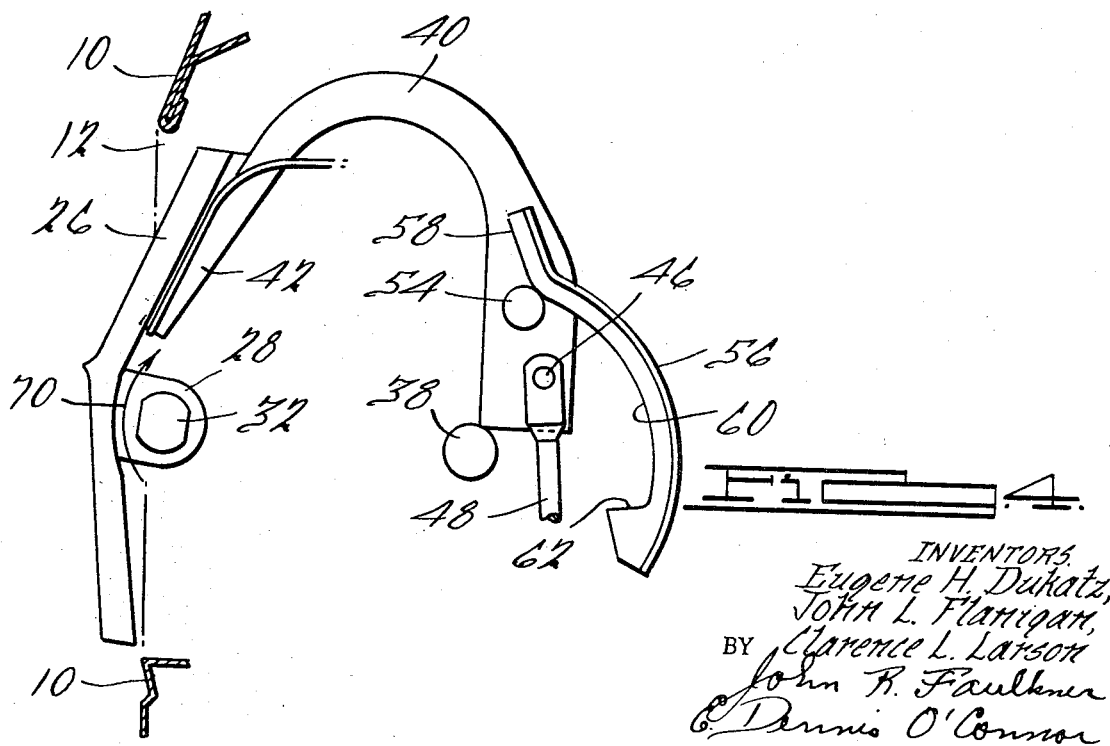

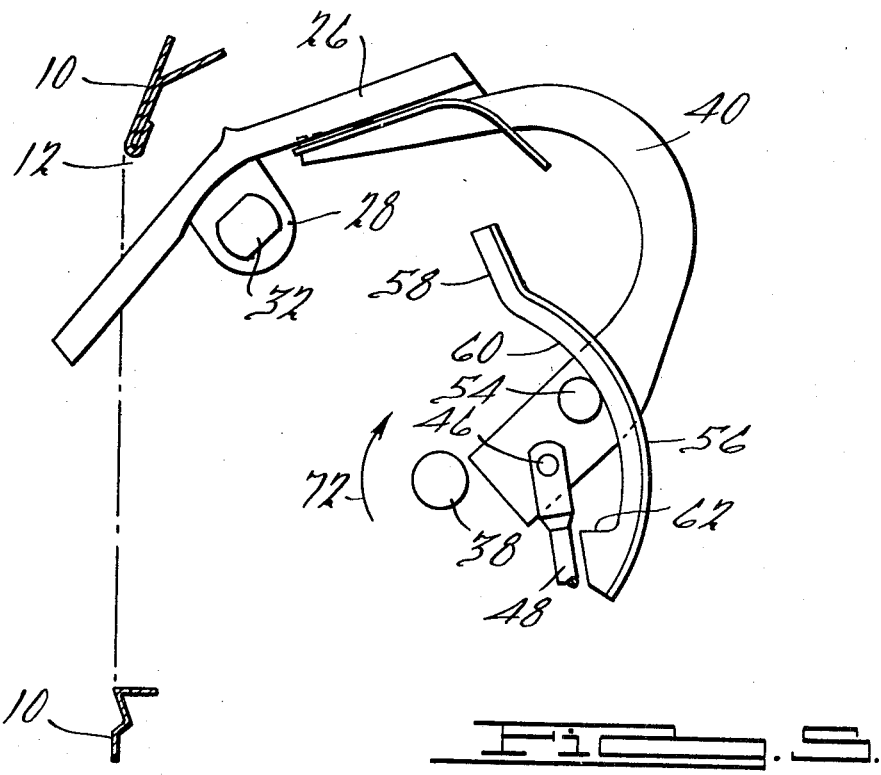
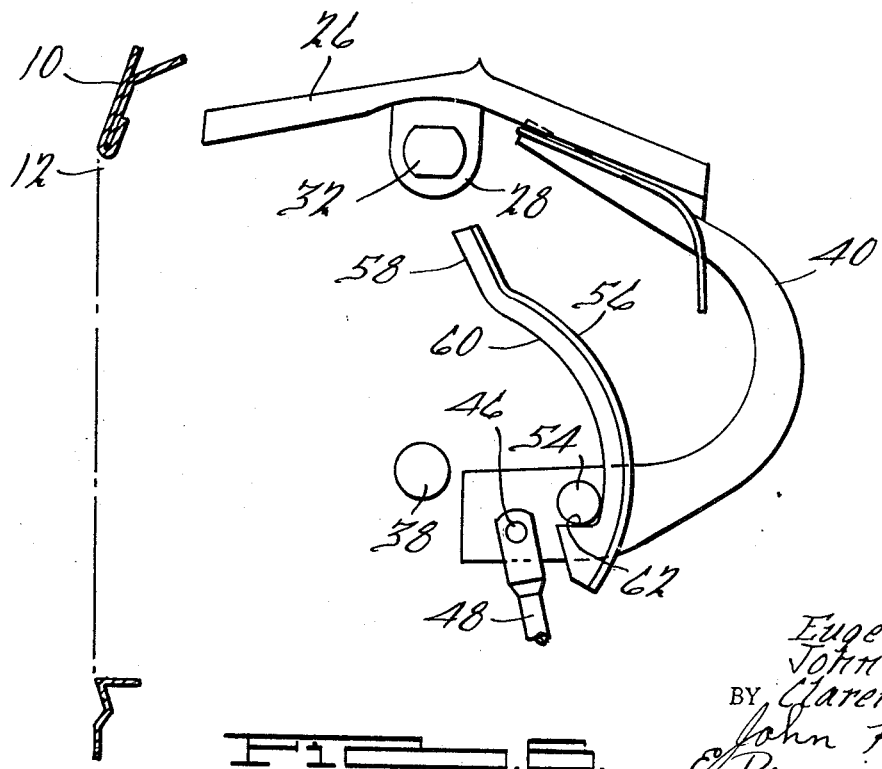

United States Patent Office 3,522,422
Patented Aug. 4, 1970

3,522,422
CONCEALED HEADLIGHT MECHANISM
Eugene H. Dukatz, Livonia, John L. Flanigan, Detroit, and Clarence L. Larson, Riverview, Mich., assignors to Ford Motor Company, Dearborn, Mich., a corporation of Delaware
Filed Dec. 27, 1967, Ser. No. 693,971
Int. Cl. B60g 1/00
U.S. Cl. 240—7.1                         9 Claims

ABSTRACT OF THE DISCLOSURE

A mechanism for controlling the movement of a closure member that conceals a recessed vehicle headlight from view when the headlight is not in use. The control mechanism operates the closure member through a compound movement utilizing only a single motor means. This movement includes initial rotation of the closure member within the opening and subsequent rotation of the closure member out of the opening so that the headlight is exposed for normal operation.

BACKGROUND OF THE INVENTION

It has become increasingly common in the design of passenger vehicles to provide headlights that are concealed from view when not in operation. In addition to enhancing the appearance of a vehicle, such a feature protects the headlight from an accumulation of road dirt during periods of daylight vehicle operation so that maximum illumination may be obtained when desired.

Automotive sylists have developed an exterior profile for a headlight concealing element and surrounding structure that is pleasing from an aesthetic viewpoint. Accordding to this design, the exterior vehicle body panel surrounding a vehicle headlight is substantially planar and has an opening therethrough. The headlight is mounted interior of this panel and is positioned to register with the panel opening. A headlight concealing closure member that is substantially planar is positioned in the plane of said panel in a closed position and has a minimum of clearance with the sides of the panel opening. When the closure member is in the closed position, its flush, minimum clearance relationship with the surrounding panel gives the panel the appearance to the casual observer of being solid with no opening therein.

A problem attendant such an arrangement is that the closure member cannot be swung in a single movement out of the opening in the panel when headlight operation is desired. This is due to the close clearance between the closure member and the sides of the panel opening. It has been proposed to alleviate this problem by the use of two motor means to promote the compound movement necessary to remove the closure member from the panel opening. This solution would introduce prohibitive expense and mechanical complexities to the vehicle design, however.

It thus is the object of our invention to provide a mechanism for controlling the movement of the headlight concealing closure member described above out of and into the opening in the panel associated therewith. This mechanism includes but a single motor means enabling the necessary compound movement of the closure member. The mechanism has the features of simple design, ease of manufacture and reliability of operation. Also, it is provided that upon a failure of the motor means during headlight operation, the closure member will be held in an open position thus preventing a sudden interruption of the light necessary for safe motor vehicle operation.

SUMMARY OF THE INVENTION

A mechanism for controlling the movement of a closure member that conceals a vehicle headlight from view, when the headlight is not in use is constructed in accordance with this invention for use in a motor vehicle having sheet metal supporting body structure and a substantially planar body panel operatively secured to said structure and having an opening formed therethrough. The mechanism includes a closure member for the opening having a closed position wherein the closure member lies substantially in plane of the panel. A hinge element is provided with the closure member being pivotally connected to the hinge element along a first pivot axis that is substantially parallel and proximate to the plane of the panel. The hinge element is operatively pivotally connected to the body structure along a second pivot axis that is substantially parallel to and remote from the plane of the panel. Motor means are operatively secured to the closure member for moving the latter. Cam means are operatively connected to the closure member and body structure and cooperate to regulate movement of the closure member from the closed position. This movement includes initial pivotal movement of the closure member about the first pivot axis while pivotal movement of the closure member about the second pivotal axis is prohibited and subsequent pivotal movement of the closure member and hinge element about the second pivot axis while pivotal movement of the closure member about the first pivot axis is prohibited.

DESCRIPTION OF THE DRAWINGS

FIG. 1 is an isometric view, having parts cut away, of the concealed headlight mechanism of this invention and attendant vehicle body structure;

FIG. 2 is a side elevation view of a portion of the movable parts of the mechanism illustrated in FIG. 1;

FIG. 3 is a view similar to FIG. 2 but showing a reduced number of parts and illustrating these parts when the closure member is in the closed position;

FIG. 4 is a view similar to FIG. 3 but illustrating the parts with the closure member having completed its first phase of movement;

FIG. 5 is a view similar to FIG. 4 but showing the closure member midway through its second phase of movement; and FIG. 6 is a view similar to FIG. 5 but illustrating the closure member at the termination of its movement and located in the fully opened position.

DETAILED DESCRIPTION OF THE INVENTION

Referring now in detail to the drawings and in particular to FIGS. 1 and 2 thereof, the numeral 10 denotes a generally planar motor vehicle body panel positioned at the extreme front or grill area of a motor vehicle. Panel 10 has an opening 12 formed therethrough. To the rearward of panel 10 are located a pair of spaced apart posts 14 and 16. These posts are either integral with or connected to the main structural members of the motor vehicle. Positioned between posts 14 and 16 is a housing 18 secured to the posts by fasteners 20 (one shown). A pair of openings 22 and 24, in which are mounted headlight lamps, are formed through housing 18.

A substantially planar closure member 26 is illustrated in FIGS. 1 and 2 in the closed position in which it lies substantially in the plane of body panel 10. Since the struture on either end of closure member 26 and housing 18 is similar, only the structure at one of these ends is described and illustrated.

A tab 28 extends rearwardly from the body of closure member 26 and is pivotally secured as by a loose fitting rivet to a movable hinge element 30. The pivot point between tab 28 and hinge element 30 is identified by the reference numeral 32. It readily may be understood that since an identical pivot point is located at the opposite end of closure member 26, the line between these two pivot points constitutes a pivot axis lying closely adjacent closure member 26 and parallel to the plane of panel 10. A spring 34 partially surrounds pivot point 32 and bears against closure member 26 and a projection 36 extending from hinge member 30. The force exerted by spring 34 prevents vibrational movement between closure member 26 and hinge member 30 during operation of the motor vehicle.

Hinge member 30 is pivotally secured to post 14, as by a loose fitting rivet, at pivot point 38. Since a pivot point identical to point 38 is located at the point of attachment of the opposite surface of side of hinge member 30 to post 16 it may be seen that the line between these pivot points constitutes a second pivot axis lying parallel to the plane of panel 10 and spaced therefrom.

An arcuate actuating arm 40 has one end 42 thereof secured to the rearward facing surface of closure member 26. End 44 of actuating arm 40 is pivotally secured by a fastener 46 to a rod 48. The end of rod 48 remote from end 44 of actuating arm 40 is secured to a movable diaphragm of a conventional vacuum motor 50. Actuating arm 40 extends through an opening 52 in the top surface of housing 18 so that upon actuation of vacuum motor 50, a force applied to actuating arm 40 by rod 48 will cause movement of actuating arm 40 as will be described in detail below.

Extending from either side of arm 40 proximate end 44 thereof, is a pin or cam follower 54. (Only the portion of cam follower 54 that extends from one side of actuating arm 40 is visible in the drawings.) A pair of cams 56 and 56' are secured to the rear wall of housing 18. Cams 56 and 56' are identical so that only cam 56 is described in detail below. Cam 56 is a multiple profile cam. A first cam profile 58 of cam 56 is a curve that is a segment of a circle having its center located along the pivot axis extending through pivot point 32. Below cam profile 58 is a second cam profile 60 that is a curve that is a segment of a circle having its center located along the pivot axis passing through pivot point 38. At the bottom of cam profile 60 is formed a shoulder-stop 62.

A bracket 64 extends from the outboard surface of hinge member 30. A projection 64 extends from the outboard surface of post 14. A coil spring 68 is connected to bracket 64 and projection 66 such that spring 68 is in a state of tension. The relationship between spring 68 and pivot point 38 is such that when closure member 26 is in the fully opened position described below, spring 68 functions as an overcenter mechanism exerting a force tending to hold the closure member 26 in the fully opened position. This feature will be explained in detail below.

Referring now to FIGS. 3 to 6 of the drawings, the movement of closure member 26 from the closed position illustrated in FIG. 3 to the fully opened position illustrated in FIG. 6 readily may be appreciated. When closure member 26 is in the fully closed position illustrated in FIG. 3, the closure member lies substantially in the plane of panel 10 within opening 12. Cam follower 54 is in contact with cam profile 58 of cam 56. Motor 50 is in a deactivated position such that rod 48 is fully extended upwardly.

When the operator of the motor vehicle desires to utilize the vehicle headlights concealed by closure member 26 and mounted in openings 22 and 24 of housing 18, a switch located within the vehicle passenger compartment is manually operated in the conventional manner. As readily may be accomplished by one having ordinary skill in the art, actuation of the headlight switch also serves to activate vacuum motor 50. Upon vacuum being applied to motor 50, the internal diaphragm of motor 50 exerts a force on rod 48 urging rod 48 downward as viewed in the drawings. Rod 48 thus exerts a force on end 44 of arm 40 that also is in a downward direction. Movement of arm 40 is controlled, however, by the contact between cam follower 54 and profile 58 of cam 56. The downward force exerted on arm 40 will cause cam follower 54 to move along cam profile 58. Since cam profile 58 is a curve that is the segment of a circle having its center lying along the pivot axis passing the pivot point 32, movement of actuating arm 40 and closure member 26 that is attached thereto, will comprise rotational movement about the pivot axis passing through pivot point 32. This rotational movement is illustrated by the arrow 70 in FIG. 4 and results in rotation of closure member 26 while said closure member remains in opening 12. The ends of closure member 26 proximate panel 12 when the closure member is in the closed position, however, move away from panel 10 such that swinging movement of closure member 26 out of opening 12 as will be described below may be accomplished. The orientation of closure member 26 after this initial rotational movement has been completed is illustrated in FIG. 4.

Rod 48 continues to exert a downwardly extending and directed force on arm 40 such that cam follower 54 moves from profile 58 and into contact with the portion of cam 56 designated profile 60. Continued downward force applied to arm 40 results in cam follower 54 moving along this profile 60. Since the curve of cam profile 60 is a segment of a circle having its center at a point along the pivot axis extending through pivot point 38, when cam follower 54 moves along profile 60 the movement of actuating arm 40 will be rotational movement about the pivot axis passing through pivot point 38. This rotational movement is illustrated by the arrow 72 in FIG. 5 of the drawing and results in a swinging movement of closure member 26 out of the opening 12 in panel 10.

FIG. 5 of the drawing illustrates the position of closure member 26 midway through the swinging movement of the closure member out of opening 12. FIG. 6 of the drawing illustrates closure member 26 in the fully opened position.

Movement of closure member 26 and actuating arm 48 is terminated by the contact of cam follower 54 with shoulder-stop 62 located at the bottom extremity of cam profile 60. This contact between cam follower 54 and shoulder-stop 62 prevents the downwardly extending force exerted by rod 48 on arm 40 from resulting in further movement of this arm. The parts remain orientated as illustrated in FIG. 6 throughout the period of headlight operation as motor 50 is in the activated condition throughout this time.

In the event of a failure of motor 50 to exert a force to hold the parts in the position illustrated in FIG. 6, these parts will be retained in this position by the force of spring 68. The orientation of spring 68 when the parts are in the position illustrated in FIG. 6 is shown in ghost in FIG. 2 and designated by the reference numeral 68'. Spring 68 has passed from the left side (as viewed in FIG. 2) of pivot point 38 to the right side of this point and thus the force exerted by spring 68 will serve to maintain the closure member out of the opening 12 despite a failure of motor 50 to exert a downward force on actuating arm 40. Spring 68 thus constitutes an overcenter mechanism acting about pivot point 38 as a fail-safe device preventing closure member 26 from returning to the closed position when the vehicle operator desires the illumination provided by the headlights mounted within housing 18.

When it is desired by the vehicle operator to terminate the operation of the vehicle headlights, vacuum no longer is supplied to vacuum motor 50. The resiliency of the diaphragm within the motor 50 will cause an upwardly extending force to be exerted along rod 48 and applied to actuating arm 40 causing a reversal of the movements described above, that is, actuating arm 40 will rotate about the pivot axis extending through pivot point 38 as cam follower 54 slides along cam profile 60. As cam follower 54 comes into contact with cam profile 58, rotation of actuating arm 40 and closure member 26 about the pivot axis extending through point 32 will occur and closure member 26 and actuating arm 40 will return to the orientation illustrated in FIGS. 1 to 3 of the drawings.

It thus may be seen that this invention provides a concealed headlight mechanism by which a closure member that conceals vehicle headlights in a closed position conveniently may be moved to an open position permitting normal headlight operation. The movement of the closure member is compound and is accomplished by motive power from a single motor means. This mechanism is of relative simplicity, reliability of design and ease of manufacture.

What is claimed is:

1. A mechanism for controlling the movement of a headlight concealing closure member and adapted for utilization in a motor vehicle having sheet metal supporting body structure and a body element operatively secured to said structure and having an opening therein, said closure member having a closed position wherein it is positioned in said opening, said mechanism including: hinge means pivotally secured to said body structure along a first pivot axis, said closure member being pivotally secured to said hinge means along a second pivot axis, first control means operatively connected to said closure member and capable of rotating said closure member about said second pivot axis while said hinge means remains stationary and said closure member remains positioned in said opening, and second control means operatively connected to said closure member and capable of terminating said rotational movement, swinging said hinge means about said first pivot axis and rotating said closure member about said first pivot axis out of said opening.

2. The mechanism of claim 1, wherein said first and second control means include motor means carried by said body structure and operable to move said closure member.

3. The mechanism of claim 2, wherein said first and second control means includes a cam follower operatively carried by said closure member, said first control means further including a first cam means having a profile that is a segment of a circle having its center at said second pivot axis, said cam follower being in contact with said first cam means profile during rotational movement of said closure member.

4. The mechanism of claim 3, wherein said second control means further includes second cam means adjacent said first cam means and having a profile that is a segment of a circle having its center at said first pivot axis, said cam follower being in contact with said second cam means profile during swinging movement of said closure member.

5. The mechanism of claim 4, wherein said first and second cam means are integrally formed.

6. In a motor vehicle having sheet metal supporting body structure, a substantially planar body panel operatively secured to said structure and having an opening therein, a closure member for said opening having a closed position wherein said closure member lies substantially in the plane of said panel, a hinge element, said closure member being pivotally connected to said hinge element along a first pivot axis that is substantially parallel and proximate to the plane of said panel, said hinge element being operatively pivotally connected to said structure along a second pivot axis that is substantially parallel to and remote from the plane of said panel, motor means operatively secured to said closure member for moving said member, and cam means operatively connected to said closure member and said structure and cooperating to permit movement of said closure member from the closed position including initial pivotal movement of said closure member about said first pivot axis while movement of said hinge element and pivotal movement of said closure member about said second axis is prevented and subsequent pivotal movement of said closure member and said hinge element about said second pivot axis while pivotal movement of said closure member about said first pivot axis is prohibited.

7. The apparatus of claim 6, wherein said body structure includes mounting means adopted to carry a vehicle headlight, said closure member concealing said headlight when viewed from exterior of said vehicle.

8. The apparatus of claim 6, wherein said cam means includes a stationary cam secured to said body structure and a cam follower operatively secured to said closure member for movement therewith.

9. The apparatus of claim 8, wherein said cam has formed thereon a first profile that is a segment of a circle having its center at said first pivot axis and that regulates said initial pivotal movement and a second profile that is a segment of a circle having its center at said second pivot axis and that regulates said subsequent pivotal movement.

References Cited

UNITED STATES PATENTS

| | | |
|---|---|---|
| 2,324,742 | 7/1943 | Voorhees et al. |
| 2,338,541 | 1/1944 | Roedding. |
| 2,360,469 | 10/1944 | Breer et al. |
| 2,388,787 | 11/1945 | Kuschel et al. |
| 2,700,725 | 1/1955 | Morphew et al. ____ 240—46.23 |

NORTON ANSHER, Primary Examiner

D. J. CLEMENT, Assistant Examiner

U.S. Cl. X.R.

240—46.05